Dec. 28, 1926.
A. G. UPTEGRAFF
BOOK
Filed April 7, 1921
1,612,240
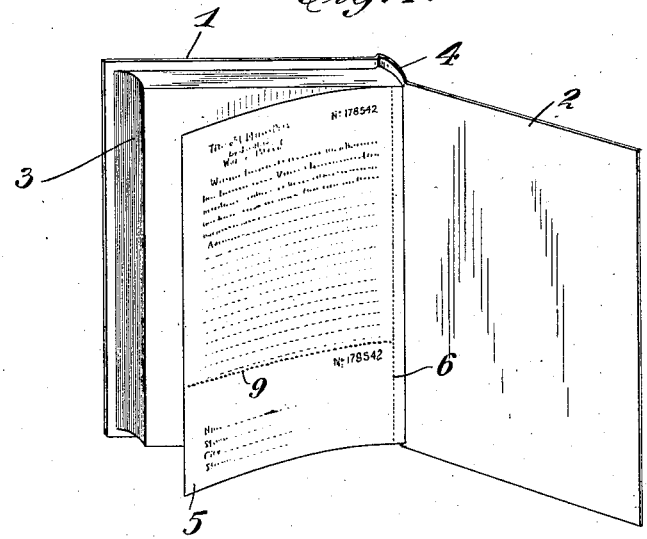
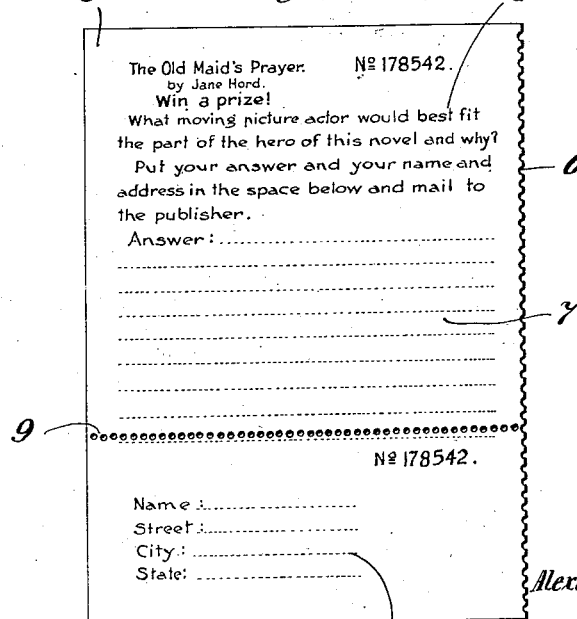

Patented Dec. 28, 1926.

1,612,240

UNITED STATES PATENT OFFICE.

ALEXANDER G. UPTEGRAFF, OF NEW YORK, N. Y.

BOOK.

Application filed April 7, 1921. Serial No. 459,237.

My present invention relates to books and has as an object to increase the sale or circulation thereof. The efficacy of inducing sales by direct personal letter or circular addressed to the probable purchasers rather than by extensive newspaper advertisement although generally recognized, has as a practical matter not been carried into execution largely because of the difficulty of obtaining satisfactory mailing lists. Such lists when compiled by usual methods are either grossly incomplete or diluted with a great excess of names of readers who borrow from public libraries but do not buy works of fiction and of others who neither borrow nor buy. Large sums would be wastefully expended for postage, stationery and printing in the use of such expanded lists.

The primary object of my invention is to provide means for making available to the publisher a mailing list which shall be complete for his purposes and the use of which shall be economical.

The obvious expedient of causing the retailer, seller or distributor of the books to compile a list of purchasers for the publisher is not practically feasible, since such books are frequently carried by the purchaser, so that there is no direct occasion for giving name and address to the seller.

A feature of my invention is to combine the book with means for inducing the purchaser to communicate his name and address to the publisher. This feature is carried out by embodying in the construction of the book a coupon which appeals to the self-interest of the purchaser to impel him to send his name and address to the publisher. Preferably, the inducement is in the form of the offer of a prize to be awarded for ability in solving a problem preferably one related in some way to the subject-matter of the book.

In the accompanying drawings in which is shown one of various possible embodiments of the several features of the invention—

Fig. 1 is a perspective view of a book embodying my invention, and;

Fig. 2 is a plan view on a larger scale showing the coupon.

Referring now to the drawings, I have shown in Fig. 1 a book embodying a front cover 1 of cloth, leather or paper, a rear cover 2 and sheets 3 held together by a binding 4. The details of construction of this book are not material to the invention, it being understood that the ordinary form of binding commonly employed is here used. Preferably a supplemental sheet 5 is bound into the book, said sheet being connected as at 6 by a line of perforation or other weakened line to the binding edge or stub of the sheet, this sheet being of the same size as the ordinary sheets of the book. The supplemental sheet preferably bears the title of the novel and a serial number for each volume of a given edition. A riddle or question 6 of some sort, space 7 for an answer and a blank 8 for the name and address of the person answering the riddle are provided on the main portion of the sheet. Before the particular question shown on the drawings can be answered, it is obvious that the novel must be read and that some thought must be expended. Persons reading books and particularly readers of fiction would find healthy mental exercise in answering such questions and, of course, would be encouraged by the offer of a prize to submit their answers to the publisher.

The publisher would thus be provided with a substantially complete list of the actual purchasers of his books and this list would be of value to him in promoting the sale of subsequent books of the same general character placed on the market by him. This list would not be padded with the names of mere readers who are not in the market for the purchase of books and the publisher is thus afforded a concentrated list of purchasers who can be circularized at low expense and with prospect of rich returns. The answers submitted by purchasers also establish a more or less personal touch with the publisher enabling the latter from the character of each answer to direct his approach for the sale of future books upon correct principles and in accordance with doctrines of modern salesmanship.

By my invention, it will also be possible to establish at a glance whether a particular volume is new or has been previously used, this depending upon whether the coupon is in or has been removed from the book.

If desired, the parts 8 for name and address may be connected by a line of perforations 9 with the rest of the sheet, and may have printed thereon the same number as appears at the head of the sheet. With this arrangement the names would be severed prior to submitting the coupons to the judges, who would render their awards on the merits of the answers, and without knowledge of the identity of the contestants.

It will be understood that the objects of my invention may be carried out in a great variety of different manners but I prefer to employ the specific combination of book and riddle coupon shown and described, the particular question indicated in the drawings being, however, only illustrative. In actual use, it will be seen that the riddle coupon 6 constitutes a sheet bound into the book, completely protected by the cover as are all the other pages. The presence of the coupon does not in any way alter the external appearance of the book. It will be understood that in the actual process of printing and binding the book, the coupon sheet is a sheet among the other sheets of the book and is printed in the same process therewith. The weakened line may if desired, be a heavy printed line or the perforations may be formed by any of the well-known processes, in the same operation as the actual printing.

If the riddle sheet were formed as an extension of one of the pages of the book, obviously the cost and inconvenience of manufacture would be increased and if the riddle sheet were in some way pasted into the book, the removal thereof would disfigure the volume, while if the riddle sheet were formed as part of the detachable paper cover in which books are ordinarily sold, there would be likelihood of its becoming lost and the removal of such paper cover would be necessitated in answering.

My construction, it will thus be seen, is economical and effective and in actual use does not involve disfiguring of the book.

Although the invention has its preferred application to books, it will be understood that the broader features thereof are applicable to other commodities as well.

I claim:—

1. In a printed and bound book, in combination, an auxiliary leaf disposed between the printed matter and one of the covers of the book, said leaf being of the same size as the main leaves of the book and including a binding stub, a detachable leaf portion connected by a line of perforations to said stub, designated blanks for the name and address of the purchaser, a question printed on said blank relating to the subject-matter of the book, and a designated blank for an answer to said question.

2. The combination set forth in claim 1 in which a line of perforations is formed between the question and answer portion of the sheet and the name and address blank and in which each of said elements bears an identification number, said numbers being identical.

3. In a printed and bound book, in combination, a riddle coupon bearing a question relating to the subject matter of a book, an identifying number, and a designated blank for the insertion of an answer, and a second coupon detachably secured to the riddle coupon and bearing the same identifying number and designated blanks for a name and address.

Signed at New York, in the county of New York, and State of New York, this 31st day of March A. D. 1921.

ALEXANDER G. UPTEGRAFF.